US011790751B2

(12) United States Patent
Buchholz (10) Patent No.: US 11,790,751 B2
(45) Date of Patent: *Oct. 17, 2023

(54) COMPENSATOR IN A DETECTOR DEVICE (71) Applicant: Carrier Corporation, Palm Beach Gardens, FL (US)

(72) Inventor: Matthew J. Buchholz, Canon City, CO (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,458

(22) Filed: Dec. 30, 2022

(65) Prior Publication Data
US 2023/0146813 A1    May 11, 2023

Related U.S. Application Data

(63) Continuation of application No. 16/755,906, filed as application No. PCT/US2018/057986 on Oct. 29, 2018, now Pat. No. 11,568,730.
(Continued)

(51) Int. Cl.
*G08B 17/10*    (2006.01)
*G08B 21/14*    (2006.01)
(Continued)

(52) U.S. Cl.
CPC ........... *G08B 21/14* (2013.01); *G08B 17/107* (2013.01); *G08B 21/16* (2013.01)

(58) Field of Classification Search
CPC ....... G08B 21/14; G08B 17/107; G08B 21/16
See application file for complete search history.

(56) References Cited

U.S. PATENT DOCUMENTS 4,011,458 A * 3/1977 Malinowski ......... G08B 17/103
340/630
4,148,022 A    4/1979 Hetznecker
(Continued)

FOREIGN PATENT DOCUMENTS

CN    1130447 A    9/1996
CN    1703831 A    11/2005
(Continued)

OTHER PUBLICATIONS

CN Application No. 201880071301 First Office Action dated Jun. 25, 2021 with English Translation, 18 pages.
(Continued)

*Primary Examiner* — Quang Pham
(74) *Attorney, Agent, or Firm* — CANTOR COLBURN LLP (57) ABSTRACT

A detector device includes a light source disposed within a chamber, a sensor disposed within the chamber, a compensator circuit electrically coupled with the sensor, and a controller. The controller is operable to receive a sensor signal generated by the sensor, determine a compensation factor to adjust the sensor signal, and generate a compensation offset signal based on the compensation factor. The controller is further operable to output the compensation offset signal to the compensator circuit to produce a compensated sensor signal as an adjustment to the sensor signal, energize the light source, monitor the compensated sensor signal with respect to an alarm limit, and trigger an alarm event based on the compensated sensor signal exceeding the alarm limit.

20 Claims, 6 Drawing Sheets

Related U.S. Application Data (60) Provisional application No. 62/578,582, filed on Oct. 30, 2017.

(51) Int. Cl.
  *G08B 17/107* (2006.01)
  *G08B 21/16* (2006.01)

(56) References Cited

U.S. PATENT DOCUMENTS

| | | | |
|---|---|---|---|
| 4,225,791 A | 9/1980 | Kompelien | |
| 4,225,860 A * | 9/1980 | Conforti | G08B 17/11 340/630 |
| 4,420,746 A * | 12/1983 | Malinowski | G08B 17/103 340/630 |
| 4,469,953 A * | 9/1984 | Fujisawa | G08B 17/113 356/338 |
| 4,514,720 A * | 4/1985 | Oberstein | G08B 26/00 340/657 |
| 4,539,556 A * | 9/1985 | Dederich | G08B 29/145 340/630 |
| 4,559,453 A * | 12/1985 | Muggli | G08B 29/043 340/630 |
| 4,644,331 A * | 2/1987 | Matsushita | G08B 29/18 340/584 |
| 4,647,785 A * | 3/1987 | Morita | G08B 17/107 340/630 |
| 4,665,311 A | 5/1987 | Cole | |
| 4,678,921 A * | 7/1987 | Nakamura | G08B 17/107 250/237 R |
| 4,680,576 A * | 7/1987 | Bauer | G08B 17/113 340/630 |
| 4,695,734 A | 9/1987 | Honma et al. | |
| 4,727,359 A * | 2/1988 | Yuchi | G08B 26/002 340/505 |
| 4,749,986 A * | 6/1988 | Otani | G08B 26/00 340/511 |
| 4,758,733 A * | 7/1988 | Mochizuki | G08B 17/107 340/630 |
| 4,769,550 A * | 9/1988 | Dolnick | G08B 17/107 340/630 |
| 4,857,895 A * | 8/1989 | Kaprelian | G08B 17/103 340/630 |
| 4,870,394 A * | 9/1989 | Corl | G08B 29/046 340/630 |
| 4,901,056 A * | 2/1990 | Bellavia | G08B 29/145 340/630 |
| 4,930,095 A * | 5/1990 | Yuchi | G08B 29/28 73/1.88 |
| 4,977,527 A * | 12/1990 | Shaw | G08B 17/10 340/630 |
| 5,155,468 A * | 10/1992 | Stanley | H04Q 9/14 340/588 |
| 5,172,096 A * | 12/1992 | Tice | G08B 29/26 340/588 |
| 5,473,314 A * | 12/1995 | Mochizuki | G08B 17/107 340/630 |
| 5,497,144 A * | 3/1996 | Schappi | G08B 29/145 340/630 |
| 5,517,175 A * | 5/1996 | Brown | G08B 29/06 340/506 |
| 5,523,743 A * | 6/1996 | Rattman | G08B 29/145 340/630 |
| 5,530,433 A * | 6/1996 | Morita | G08B 29/185 340/630 |
| 5,543,777 A * | 8/1996 | Vane | G08B 29/22 340/630 |
| 5,546,074 A * | 8/1996 | Bernal | G08B 29/145 340/630 |
| 5,546,974 A * | 8/1996 | Bireley | A01G 25/167 239/69 |
| 5,552,763 A * | 9/1996 | Kirby | G08B 29/26 340/506 |
| 5,552,765 A * | 9/1996 | Vane | G08B 29/145 340/630 |
| 5,561,610 A * | 10/1996 | Schricker | G01D 3/08 702/185 |
| 5,576,697 A * | 11/1996 | Nagashima | G08B 29/183 340/630 |
| 5,705,988 A * | 1/1998 | McMaster | G08B 29/185 340/630 |
| 5,751,209 A * | 5/1998 | Werner | G08B 17/00 340/517 |
| 5,798,701 A * | 8/1998 | Bernal | G08B 17/10 340/630 |
| 5,808,296 A * | 9/1998 | McMonagle | H03F 3/45475 250/221 |
| 5,821,866 A * | 10/1998 | Bernal | G08B 17/113 340/630 |
| 5,945,924 A * | 8/1999 | Marman | G08B 17/10 340/928 |
| 5,950,147 A * | 9/1999 | Sarangapani | G05B 23/0232 702/182 |
| 6,011,478 A * | 1/2000 | Suzuki | G08B 17/107 340/630 |
| 6,057,549 A * | 5/2000 | Castleman | G08B 29/22 250/339.14 |
| 6,154,142 A * | 11/2000 | Kosugi | G08B 29/24 340/584 |
| 6,157,024 A | 12/2000 | Chapdelaine et al. | |
| 6,188,318 B1 * | 2/2001 | Katz | G08B 29/24 340/567 |
| 6,188,340 B1 * | 2/2001 | Matsumoto | G01D 3/02 341/110 |
| 6,225,910 B1 * | 5/2001 | Kadwell | G08B 29/043 340/630 |
| 6,229,439 B1 | 5/2001 | Tice | |
| 6,288,647 B1 * | 9/2001 | Yamano | G08B 17/107 340/630 |
| 6,396,405 B1 * | 5/2002 | Bernal | G08B 17/107 340/630 |
| 6,420,863 B1 | 7/2002 | Milde et al. | |
| 6,429,739 B1 * | 8/2002 | Olsson | H03G 1/04 330/136 |
| 6,455,839 B1 * | 9/2002 | O'Connor | G01V 8/12 250/221 |
| 6,456,379 B1 | 9/2002 | Kunz et al. | |
| 6,507,023 B1 * | 1/2003 | Parham | G08B 29/24 250/342 |
| 6,515,283 B1 * | 2/2003 | Castleman | G08B 17/12 340/578 |
| 6,583,404 B1 * | 6/2003 | Sakurai | G08B 17/107 250/222.2 |
| 6,677,823 B2 * | 1/2004 | Terosky | H03G 3/3042 330/136 |
| 6,720,875 B2 | 4/2004 | Philippe | |
| 6,895,827 B2 * | 5/2005 | Arai | G01L 3/108 73/862.324 |
| 6,958,689 B2 | 10/2005 | Anderson et al. | |
| 7,224,284 B2 * | 5/2007 | Mi | G08B 29/22 340/636.11 |
| 7,286,215 B2 * | 10/2007 | Imura | G01N 21/274 356/213 |
| 7,440,100 B2 * | 10/2008 | Siemens | G01N 21/53 356/338 |
| 7,474,227 B2 * | 1/2009 | Qualey, III | G08B 17/107 340/630 |
| 7,545,487 B2 * | 6/2009 | Kok | G01N 21/314 356/53 |
| 7,638,744 B2 * | 12/2009 | Huang | G09G 3/3406 315/307 |
| 7,681,068 B2 * | 3/2010 | Liss | H04L 41/06 714/4.1 |
| 7,786,877 B2 | 8/2010 | Hou | |
| 7,804,402 B2 | 9/2010 | Lang et al. | |
| 7,920,111 B2 * | 4/2011 | Abdulaev | G09G 3/3426 345/82 |

(56) References Cited

U.S. PATENT DOCUMENTS

| | | | | |
|---|---|---|---|---|
| 7,940,190 | B2* | 5/2011 | Penney | G08B 29/043 |
| | | | | 340/630 |
| 8,232,884 | B2* | 7/2012 | Pattok | G08B 29/145 |
| | | | | 340/693.6 |
| 8,284,065 | B2 | 10/2012 | Gonzales | |
| 8,395,501 | B2 | 3/2013 | Gonzales | |
| 8,482,721 | B2* | 7/2013 | Snyder | G01C 15/006 |
| | | | | 356/3.01 |
| 8,624,730 | B2* | 1/2014 | Chasko | H04L 67/12 |
| | | | | 340/517 |
| 8,629,779 | B2 | 1/2014 | Aebersold et al. | |
| 8,681,011 | B2* | 3/2014 | Conforti | G08B 29/26 |
| | | | | 340/630 |
| 8,687,510 | B1* | 4/2014 | Shirali | H04W 28/0236 |
| | | | | 370/252 |
| 8,884,771 | B2 | 11/2014 | Cooke et al. | |
| 8,907,802 | B2 | 12/2014 | Erdtmann | |
| 9,013,317 | B2* | 4/2015 | Brigham | G08B 17/107 |
| | | | | 340/630 |
| 9,019,109 | B2 | 4/2015 | Warmack et al. | |
| 9,030,328 | B2 | 5/2015 | Aebersold | |
| 9,076,321 | B2* | 7/2015 | Farley | G08B 29/185 |
| 9,087,447 | B2 | 7/2015 | Gruber et al. | |
| 9,098,987 | B2* | 8/2015 | Mueller | G01N 21/59 |
| 9,117,360 | B1* | 8/2015 | Conforti | G08B 29/181 |
| 9,189,940 | B2 | 11/2015 | Cooke et al. | |
| 9,396,637 | B2 | 7/2016 | Chandler et al. | |
| 9,659,485 | B2* | 5/2017 | Piccolo, III | G08B 29/145 |
| 9,679,468 | B2* | 6/2017 | Piccolo, III | G08B 29/145 |
| 9,781,802 | B1* | 10/2017 | Tsai | H05B 47/125 |
| 9,824,563 | B2 | 11/2017 | Uchida | |
| 9,959,748 | B2* | 5/2018 | Motta | G08B 29/145 |
| 10,037,686 | B1* | 7/2018 | Magyar | G08B 17/06 |
| 10,204,508 | B2 | 2/2019 | Meah | |
| 10,339,794 | B2* | 7/2019 | Bajaj | G08B 29/145 |
| 10,769,938 | B1* | 9/2020 | Chen | G08B 29/145 |
| 10,825,334 | B2* | 11/2020 | Pedersen | G08B 29/043 |
| 11,181,497 | B2* | 11/2021 | Turnbull | G01N 33/0031 |
| 2001/0038338 | A1* | 11/2001 | Kadwell | G08B 29/24 |
| | | | | 340/630 |
| 2002/0001386 | A1 | 1/2002 | Akiyama | |
| 2003/0001746 | A1 | 1/2003 | Bernal et al. | |
| 2003/0006822 | A1* | 1/2003 | Murakami | G01K 15/00 |
| | | | | 374/E15.001 |
| 2003/0233205 | A1* | 12/2003 | Horne | G01D 3/022 |
| | | | | 702/104 |
| 2003/0235817 | A1* | 12/2003 | Bartkowiak | A61B 5/14532 |
| | | | | 435/5 |
| 2004/0030474 | A1* | 2/2004 | Samuel | B60G 17/0185 |
| | | | | 701/31.4 |
| 2004/0063154 | A1* | 4/2004 | Booth | G08B 29/26 |
| | | | | 435/7.1 |
| 2005/0100478 | A1 | 5/2005 | Harvey | |
| 2006/0007010 | A1* | 1/2006 | Mi | G08B 29/20 |
| | | | | 340/630 |
| 2008/0024119 | A1* | 1/2008 | Gualtieri | G01D 5/2403 |
| | | | | 374/E7.018 |
| 2008/0246623 | A1* | 10/2008 | Nagashima | G08B 17/107 |
| | | | | 340/630 |
| 2009/0115513 | A1* | 5/2009 | Hongo | H03F 1/3247 |
| | | | | 330/149 |
| 2011/0144936 | A1* | 6/2011 | Kawashima | G08B 17/107 |
| | | | | 702/87 |
| 2011/0160560 | A1* | 6/2011 | Stone | G01L 9/125 |
| | | | | 600/398 |
| 2011/0160609 | A1* | 6/2011 | Stone | G01L 19/148 |
| | | | | 600/561 |
| 2011/0255091 | A1* | 10/2011 | Aebersold | G08B 17/107 |
| | | | | 356/438 |
| 2012/0121277 | A1* | 5/2012 | Kim | G03G 15/2039 |
| | | | | 399/33 |
| 2012/0149315 | A1* | 6/2012 | Nagayama | H03G 3/30 |
| | | | | 330/253 |
| 2012/0170035 | A1* | 7/2012 | Dohi | G08B 17/107 |
| | | | | 356/343 |
| 2012/0268281 | A1* | 10/2012 | Hojmose | G08B 17/113 |
| | | | | 340/630 |
| 2013/0245981 | A1* | 9/2013 | Estes | G01D 3/022 |
| | | | | 702/87 |
| 2014/0015668 | A1* | 1/2014 | Hanses | G08B 29/24 |
| | | | | 340/630 |
| 2014/0015678 | A1* | 1/2014 | Zribi | G08B 29/183 |
| | | | | 340/589 |
| 2014/0015680 | A1* | 1/2014 | Chandler | G08B 29/26 |
| | | | | 340/630 |
| 2014/0320296 | A1* | 10/2014 | Thurber | G08B 21/14 |
| | | | | 340/632 |
| 2016/0335868 | A1* | 11/2016 | Schmidt | G08B 17/107 |
| 2017/0159650 | A1* | 6/2017 | Richter | F16K 99/0001 |
| 2017/0249819 | A1 | 8/2017 | Uchida | |
| 2017/0340996 | A1* | 11/2017 | Jo | B01D 35/06 |
| 2017/0372776 | A1* | 12/2017 | Walker | G11C 11/419 |
| 2018/0011198 | A1* | 1/2018 | Zalewski | G01S 19/22 |
| 2018/0073982 | A1* | 3/2018 | Ebata | G01N 21/61 |
| 2018/0158313 | A1* | 6/2018 | Meah | G08B 29/24 |
| 2018/0278088 | A1* | 9/2018 | Toyoda | H02J 3/18 |
| 2019/0171860 | A1* | 6/2019 | Wu | G06F 3/0418 |
| 2019/0180590 | A1* | 6/2019 | Fischer | G08B 29/183 |
| 2020/0249143 | A1* | 8/2020 | Takeuchi | G01N 15/1459 |
| 2020/0320844 | A1 | 10/2020 | Buchholz | |

FOREIGN PATENT DOCUMENTS

| | | |
|---|---|---|
| CN | 102984626 A | 3/2013 |
| CN | 103914943 A | 7/2014 |
| CN | 204390401 U | 6/2015 |
| CN | 204891008 U | 12/2015 |
| CN | 105608825 A | 5/2016 |
| CN | 205302539 U | 6/2016 |
| CN | 105913605 A | 8/2016 |
| CN | 106327779 A | 1/2017 |
| CN | 106341911 A | 1/2017 |
| CN | 206097376 U | 4/2017 |
| DE | 60011372 T2 | 6/2005 |
| DE | 102011108389 A1 | 1/2013 |
| EP | 0418410 B1 | 3/1991 |
| EP | 0618555 A2 | 10/1994 |
| EP | 0765513 B1 | 6/2000 |
| EP | 1098284 A2 | 5/2001 |
| EP | 0714541 B1 | 10/2001 |
| EP | 1369836 A1 | 12/2003 |
| EP | 1100061 B1 | 6/2004 |
| EP | 2273466 A1 | 1/2011 |
| EP | 2363844 A1 | 9/2011 |
| GB | 2047883 A | 12/1980 |
| WO | 1998201615 A2 | 5/1998 |
| WO | 0072282 A1 | 11/2000 |
| WO | 2013014561 A1 | 1/2013 |

OTHER PUBLICATIONS

EP Application No. 18801215.7 Office Action dated May 25, 2021, 7 pages.
IN Application No. 202017013869 Office Action dated Mar. 17, 2021, 5 pages.
International Application No. PCT/US2018/057986 International Search Report and Written Opinion dated Jan. 25, 2019, 15 pages.
Motorola Semiconductor Technical Data Document No. MC1450 10/D; "Photoelectric Smoke Detector IC with I/O" Rev 4; 13 Pages; 2001; Home Page: http://www.motorola.com/semiconductors/; downloaded from: www.datasheetcatalog.com.
Third Party Observations from Hekatron Vertriebs GmbH for Corresponding European Publication No. EP3704679A1; Date of Letter: Nov. 11, 2021, Date of Receipt: Nov. 29, 2022, no English translation, 28 pages.

* cited by examiner

COMPENSATOR IN A DETECTOR DEVICE

CROSS REFERENCE TO RELATED APPLICATIONS

This is a continuation application of U.S. application Ser. No. 16/755,906, filed Apr. 14, 2020, which is a U.S. National Stage filing of Application No. PCT/US2018/057986, filed on Oct. 29, 2018, which claims the benefit of U.S. Provisional Application No. 62/578,582 filed on Oct. 30, 2017, the disclosures of which are incorporated herein by reference in their entirety.

BACKGROUND

The subject matter disclosed herein generally relates to detector devices, and more particularly to a detector device including a compensator.

Photoelectric detector devices, such as smoke detectors, typically use a light source transmitted at an angle relative to a photo detector that prevents a sufficiently high level of light from being detected by the photo detector under nominal conditions. When smoke is present, smoke particles scatter the light from the light source and some portion of the light is detected by the photo detector. The signal level detected by the photo detector can vary due to a number of effects, such as environmental conditions, component variations, component age, and the like.

BRIEF DESCRIPTION

According to one embodiment, a detector device includes a light source disposed within a chamber, a sensor disposed within the chamber, a compensator circuit electrically coupled with the sensor, and a controller. The controller is operable to receive a sensor signal generated by the sensor, determine a compensation factor to adjust the sensor signal, generate a compensation offset signal based on the compensation factor, and output the compensation offset signal to the compensator circuit to produce a compensated sensor signal as an adjustment to the sensor signal. The controller is further operable to energize the light source, monitor the compensated sensor signal with respect to an alarm limit, and trigger an alarm event based on the compensated sensor signal exceeding the alarm limit.

In addition to one or more of the features described above or below, or as an alternative, further embodiments may include where the compensator circuit includes an amplification circuit operable to amplify a sensor output of the sensor as an amplified sensor signal and a summing circuit operable to sum the amplified sensor signal with the compensation offset signal to produce the compensated sensor signal.

In addition to one or more of the features described above or below, or as an alternative, further embodiments may include where the summing circuit is an analog circuit.

In addition to one or more of the features described above or below, or as an alternative, further embodiments may include an analog-to-digital converter operable to sample and quantize the compensated sensor signal as a digital value and a digital-to-analog converter operable to convert the compensation offset signal from a digital signal to an analog signal prior to summing at the summing circuit.

In addition to one or more of the features described above or below, or as an alternative, further embodiments may include where the sensor signal received at the controller is the amplified sensor signal as sampled and quantized through the analog-to-digital converter when the compensation offset signal has a zero offset value.

In addition to one or more of the features described above or below, or as an alternative, further embodiments may include where the controller is further operable to de-energize the light source, determine one or more error sources of the sensor signal with the light source de-energized, and determine the compensation factor as an adjustment needed to reach a target baseline clean air value based on the one or more error sources.

In addition to one or more of the features described above or below, or as an alternative, further embodiments may include where the controller is further operable to determine whether the compensated sensor signal has increased above a baseline value and increase the compensation offset signal until the compensated sensor signal is at or below the baseline value.

In addition to one or more of the features described above or below, or as an alternative, further embodiments may include where the controller is further operable to detect a hush request, increase the compensation offset signal until the compensated sensor signal is below the alarm limit responsive to the hush request, and reset the compensation offset signal after a predetermined period of time elapses from detection of the hush request.

In addition to one or more of the features described above or below, or as an alternative, further embodiments may include where the controller is further operable to monitor a temperature sensor to determine a current temperature value and determine the compensation factor based on the current temperature value and a temperature to compensation offset mapping.

In addition to one or more of the features described above or below, or as an alternative, further embodiments may include where the controller is further operable to track an average value of the compensated sensor signal over an extended time period and decrease the compensation offset signal based on the average value until the compensated sensor signal is at or below a long-term target value.

According to another embodiment, a method of operating a detector device includes receiving, at a controller of the detector device, a sensor signal generated by a sensor of the detector device, determining a compensation factor to adjust the sensor signal, generating a compensation offset signal based on the compensation factor, and outputting the compensation offset signal to a compensator circuit to produce a compensated sensor signal as an adjustment to the sensor signal. The method can also include monitoring the compensated sensor signal with respect to an alarm limit and triggering an alarm event based on the compensated sensor signal exceeding the alarm limit.

Technical effects of embodiments of the present disclosure include compensating a detector of a detector device to enhance detection capabilities.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
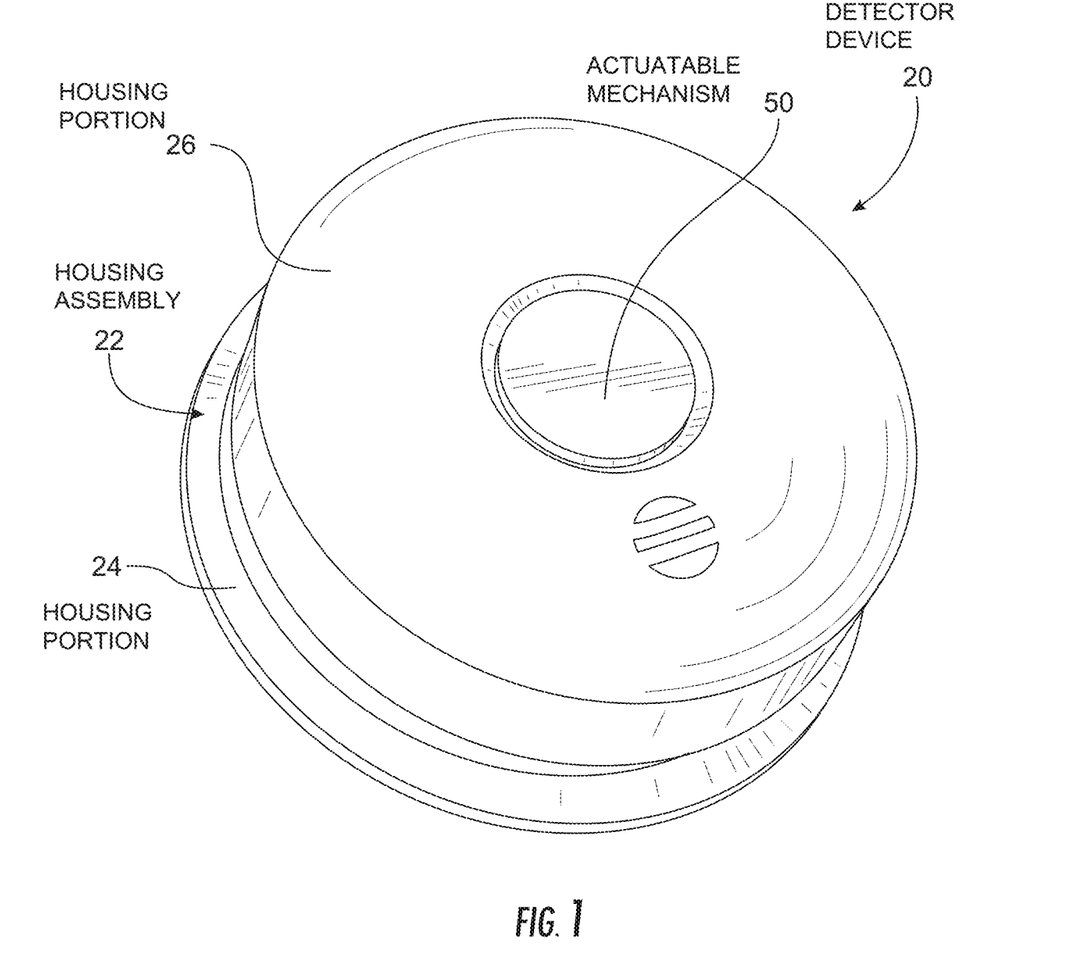
FIG. 1 is a perspective view of an example of a detector device according to an embodiment.
Figure 2:
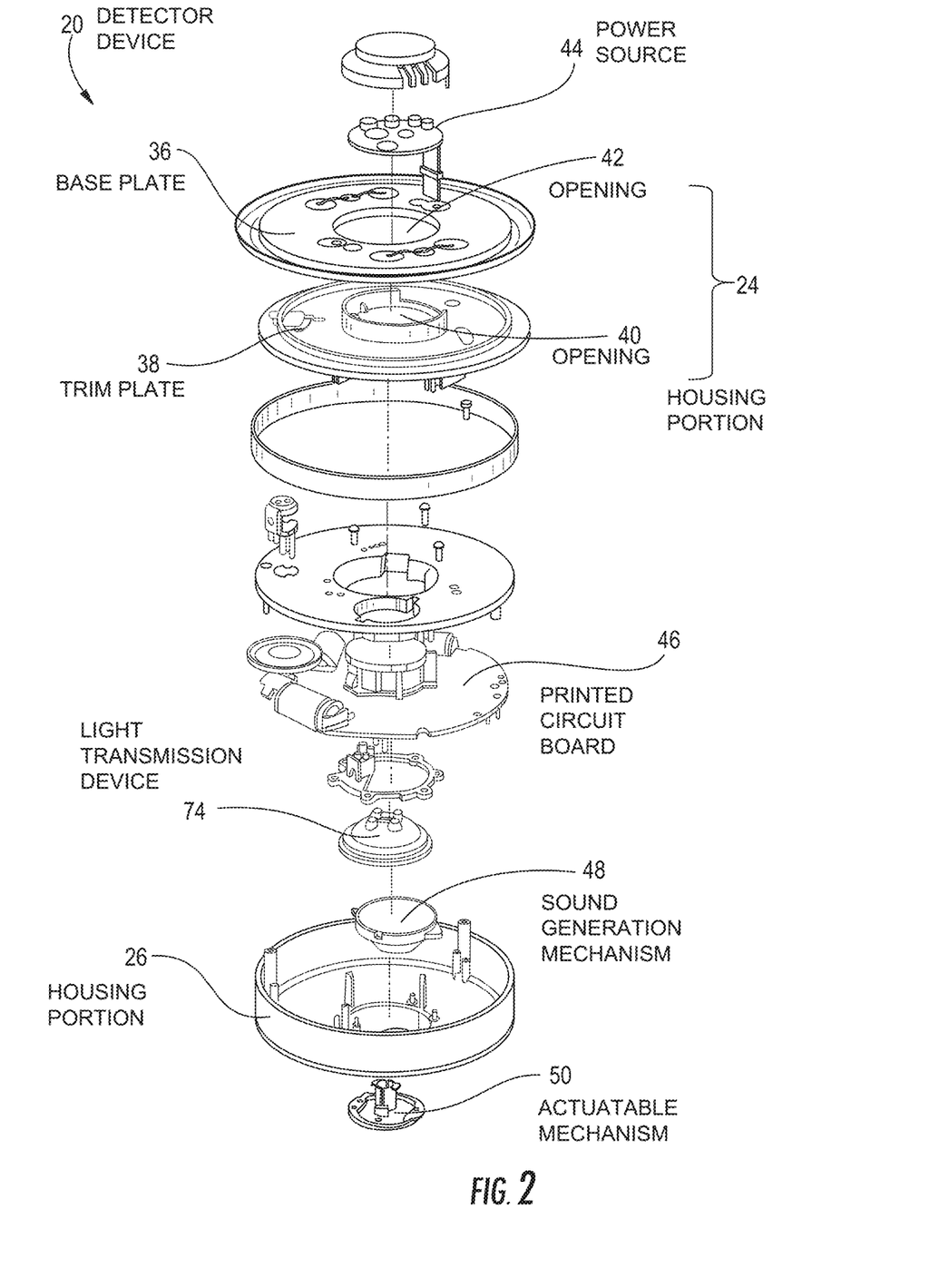
FIG. 2 is an exploded view of the detector device of FIG. 1 according to an embodiment.
Figure 3:
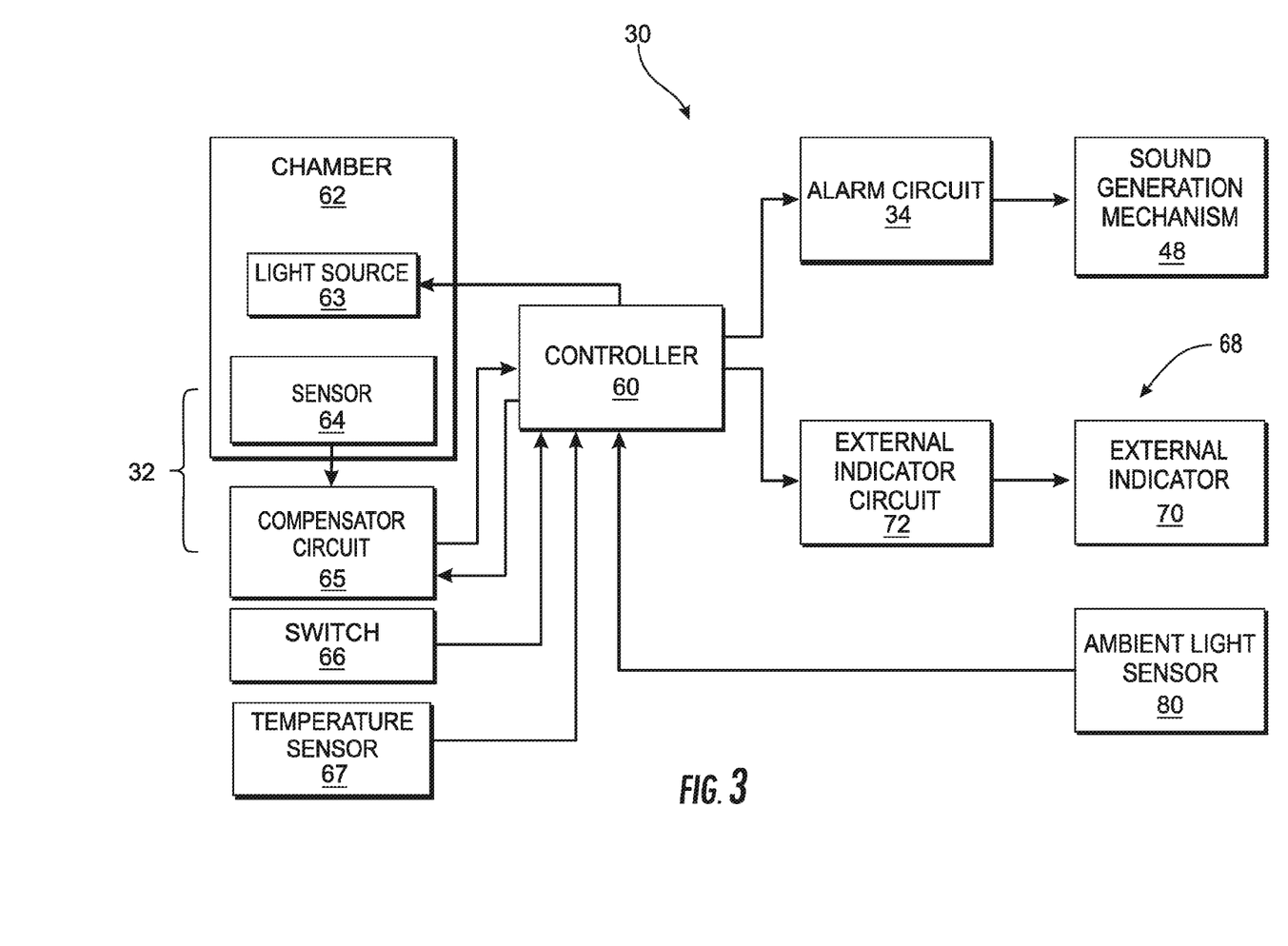
FIG. 3 is a schematic diagram of a control system of a detector device according to an embodiment.

Referring now to FIGS. 1-3, an example of a detector device 20 is illustrated. The detector device 20 includes a housing assembly 22 having a first, upper housing portion 24 and a second, lower housing portion 26 that is removably connected to the first housing portion 24. The detector device 20 further includes a control system 30 including at least one detector circuit 32 and at least one alarm circuit 34 described in more detail below with reference to FIGS. 3 and 4. When the first and second housing portions 24, 26 are connected, the first and second housing portions 24, 26 enclose the control system 30 and other components necessary to operation of the detector device 20. As used herein, the terms "upper", "lower", and the like are in reference to the detector device 20 in use as it is mounted on a surface, such as a ceiling in a building for example. Therefore, the upper housing portion 24 is typically closer to the ceiling than the lower housing portion 26, and the lower housing portion 26 is typically the portion of the detector device 20 that will face downward toward the floor of the building. In some embodiments, the detector device 20 may be mounted on a wall such that upper housing portion 24 is closer to the wall than the lower housing portion 26, and the lower housing portion 26 is typically the portion of the device 20 that will face outward toward the interior space of the room or space to be monitored.

In the non-limiting embodiment of FIG. 2, the upper housing portion 24 includes a base plate 36 and a trim plate 38 disposed upwardly adjacent the base plate 36. The trim plate 38 is typically positioned adjacent to or flush with a mounting surface, such as a ceiling or wall for example. As shown, both the trim plate 38 and the base plate 36 include a centrally located opening 40, 42 respectively, having a similar size and shape. In embodiments where the detector device 20 is "hardwired", a power source 44 located within the mounting surface, such as an AC power supply, for example, may extend into the aligned openings 40, 42.

A printed circuit board 46 is disposed generally between the base plate 36 and an adjacent surface of the lower housing portion 26. The printed circuit board 46 includes the circuitry and/or components associated with the at least one detector circuit 32 and at least one alarm circuit 34. In embodiments where the detector device 20 is "hardwired", the printed circuit board 46 is directly connected to the power source 44. In such embodiments, part of the printed circuit board 46 may extend into the central opening 40, 42 of the upper housing portion 24 to connect to the power source 44. The printed circuit board 46 may be adapted to receive one or more batteries sufficient to provide power thereto to operate the detector device 20 for an extended period of time. The power provided by the batteries may be the sole source of power used to operate the detector device 20, or alternatively, may be supplemental to the power source 44, for example in the event of a failure or loss of power at the power source.

The detector device 20 can include a light transmission device 74, such as a light pipe for example, positioned within the housing 22 generally between the printed circuit board 46 and the lower housing portion 26. The light transmission device 74 can be a passive device formed from a clear or generally transparent plastic material and configured to diffuse and evenly distribute the light generated as an external indicator, such as a light emitting diode or other display element.

A sound generation mechanism 48 may be disposed between the printed circuit board 46 and the lower housing portion 26. The sound generation mechanism 48 receives power from the printed circuit board 46 to generate a noise in response to detection of a condition. Coupled to the lower housing portion 26 is an actuatable mechanism 50, such as a button. The actuatable mechanism 50 may be a button configured to perform one or more functions of the detector device 20 when actuated. Examples of operations performed via the actuatable mechanism 50 include, but are not limited to, a press to test function, an alarm "hush", a low battery "hush", and end of life "hush", radio frequency enrollment of additional detector devices 20 such as in a detection system including a plurality of detector devices 20 configured to communicate with one another wirelessly, and to reset the detector device 20 once removed from its packaging, for example.

In the illustrated, non-limiting embodiment, the actuatable mechanism 50 is received within an opening formed in the lower housing portion 26, and is operably coupled to a control system 30 of the printed circuit board 46. Although the actuatable mechanism 50 is shown positioned at the center of the lower housing portion, embodiments where the actuatable mechanism 50 is located at another position are also within the scope of the disclosure. Further, it should be understood that in embodiments where the actuatable mechanism 50 performs multiple operations, there may be only a single actuatable mechanism 50 located on the detector device 20 and no other mechanism is required. Alternatively, the detector device 20 may include a plurality of actuatable mechanisms 50, each being operable to perform a distinct function or the actuatable mechanism 50 may be divided to form a plurality of actuatable mechanisms. In embodiments where the detector device 20 includes a plurality of separate actuatable mechanisms 50, the actuatable mechanisms 50 may be located at any location relative to the housing 22.

With reference to FIG. 3, a schematic diagram of an example of a control system 30 of the detector device 20 of FIGS. 1 and 2 is shown in more detail. The control system 30 includes a controller 60 operable to receive an input from the at least one detector circuit 32, for example, from a chamber 62. It should be understood that the detector device 20 may be adapted for detection of a variety of hazardous conditions, including but not limited to smoke, carbon monoxide, explosive gas, and heat, for example. Further, while the discussion herein refers to controller 60, one skilled in the art will recognize that the functionality and intelligence associated with this element may be embodied in a microcontroller, a microprocessor, a digital signal processor (DSP), a programmable logic device (PLD), an application specific integrated circuit (ASIC), a field programmable gate array (FPGA), or other intelligent, programmable device with associated input/output interfaces, memory, and supporting circuitry. Therefore, the use of the term "controller" herein shall be construed to cover any of these structures.

The detector circuit 32 includes a sensor 64 operable to detect light from a light source 63 and conditioned by a compensator circuit 65 electrically coupled to the sensor 64 and controlled by controller 60. The sensor 64 can be, for instance, a photo detector sensor. The controller 60 also receives an input from a user-actuated switch 66 input, for example, coupled to the actuatable mechanism 50. The controller 60 can also receive inputs from a temperature sensor 67, an ambient light sensor 80, and/or other sensors (not depicted). The controller 60 utilizes the inputs from these components 64, 65, 66, 67, 80 to generate an output alarm condition when the sensed environmental conditions so dictate. An alarm circuit 34 is utilized to broadcast via the sound generation mechanism 48 an appropriate audible sound, depending on which condition has been detected. The alarm circuit 34 may include both tone and synthesized voice message generation capabilities, or may be a simple piezo-electric type device. The detector device 20 can also include a visual warning system 68 with an external indicator circuit 72 and an external indicator 70. The external indicator 70 can be a light emitting diode or other display element used to externally convey status and alerts. It should be understood that the detector device 20 illustrated and described herein is intended as an example only and that a detector device 20 having any configuration and capability is contemplated herein.

In embodiments, the controller 60 energizes the light source 63 during normal operation, and the sensor 64, which is physically offset from the light source 63 in the chamber 62, detects light from the light source 63 as scattered by particles in the chamber 62. The compensator circuit 65 can amplify the output of the sensor 64 and apply a compensation offset signal as further described herein.

Figure 4:
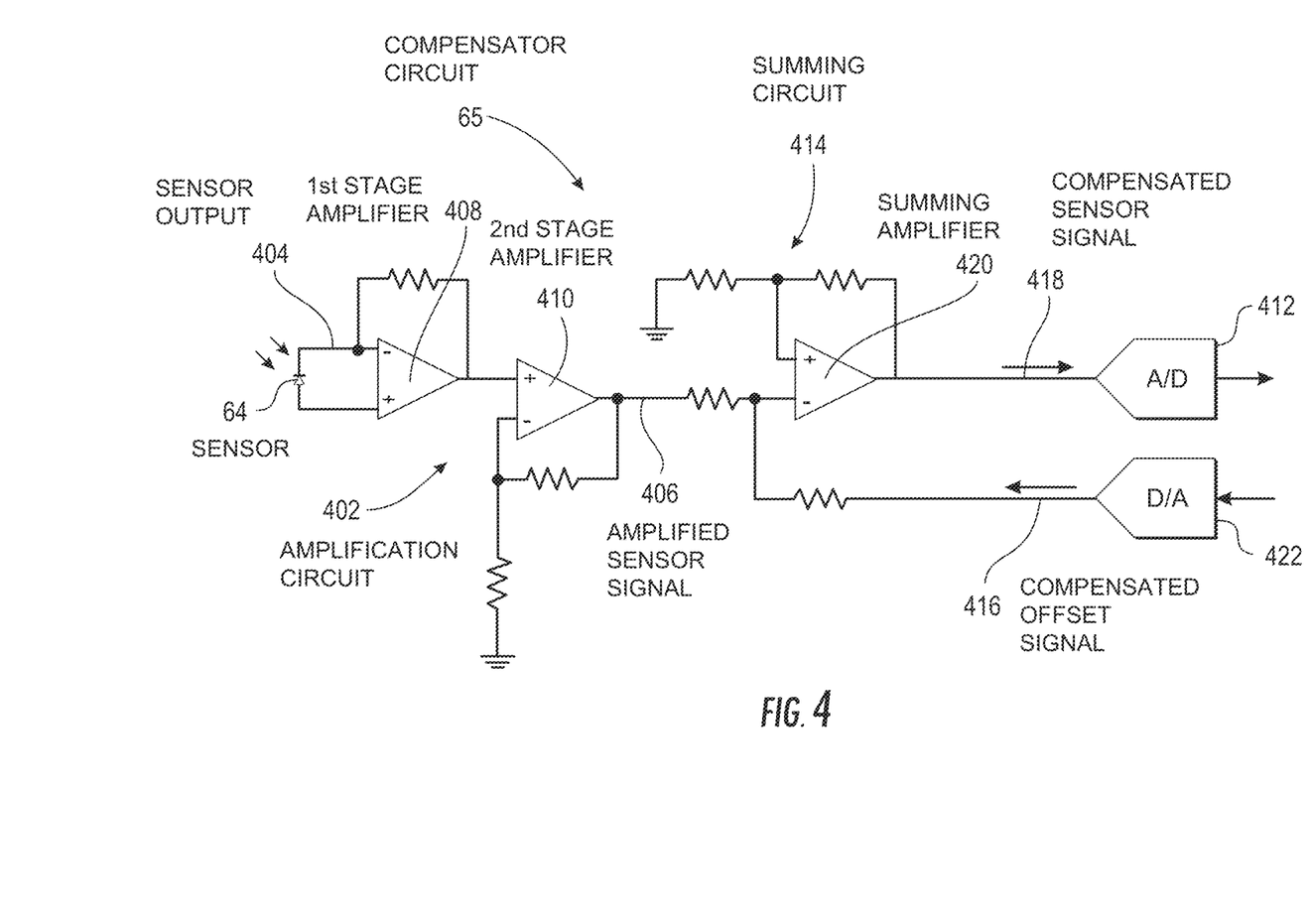
FIG. 4 is a circuit diagram of a compensator circuit of a detector device according to an embodiment.

FIG. 4 depicts an example of the compensator circuit 65 in greater detail. The compensator circuit 65 includes an amplification circuit 402 operable to amplify a sensor output 404 of the sensor 64 as an amplified sensor signal 406. In the example of FIG. 4, the amplification circuit 402 includes a first stage amplifier 408 to provide an initial amplification to the sensor output 404 and a second stage amplifier 410 to further scale the sensor output 404 as the amplified sensor signal 406, which may be optimized for a voltage range of an analog-to-digital (A/D) converter 412, e.g., about 0 to 2.5 volt range. In some embodiments, the voltage range of the A/D converter 412 can be different, such as about 0 volts to 5 volts, about −5 volts to +5 volts, and other such ranges. The A/D converter 412 can be part of the controller 60 or external to the controller 60 of FIG. 3. The compensator circuit 65 also includes a summing circuit 414 operable to sum the amplified sensor signal 406 with a compensation offset signal 416 to produce the compensated sensor signal 418. In the example of FIG. 4, the summing circuit 414 is an analog circuit with a summing amplifier 420 operable on analog versions of the amplified sensor signal 406 and the compensation offset signal 416. The A/D converter 412 is operable to sample and quantize the compensated sensor signal 418 as a digital value. Notably, a single instance of the A/D converter 412 can detect an offset compensated or a non-offset compensated instance of a sensor signal from the sensor 64 based on the value of the compensation offset signal 416.

A digital-to-analog (D/A) converter 422 is operable to convert the compensation offset signal 416 from a digital signal to an analog signal prior to summing at the summing circuit 414. Similar to the A/D converter 412, the D/A converter 422 can be part of the controller 60 or external to the controller 60 of FIG. 3. The compensation offset signal 416 generated by the controller 60 can adjust the amplified sensor signal 406 as the compensated sensor signal 418 prior to sampling by the A/D converter 412. Performing signal adjustments external to the controller 60 and in an analog format can preserve the available range of the A/D converter 412 and enhance corrections beyond the levels possible with only digital adjustments, as described herein. By performing compensation in the analog domain prior to conversion to the digital domain, the range of detectable signals can be shifted down from a value that would otherwise saturate the A/D converter 412 upon conversion to the digital domain. For instance, if the A/D converter 412 saturates with an input value of 2.5 volts, any voltage level above 2.5 volts cannot be discerned. However, if compensation shifts a 2.7 volt signal down by 0.5 volts to 2.2 volts, values between 2.5-2.7 volts that would not otherwise be distinguishable (i.e., both appear as 2.5 volts at the controller 60 due to saturation of the A/D converter 412) become observable levels of 2.0-2.2 volts at the A/D converter 412.

Figure 5:
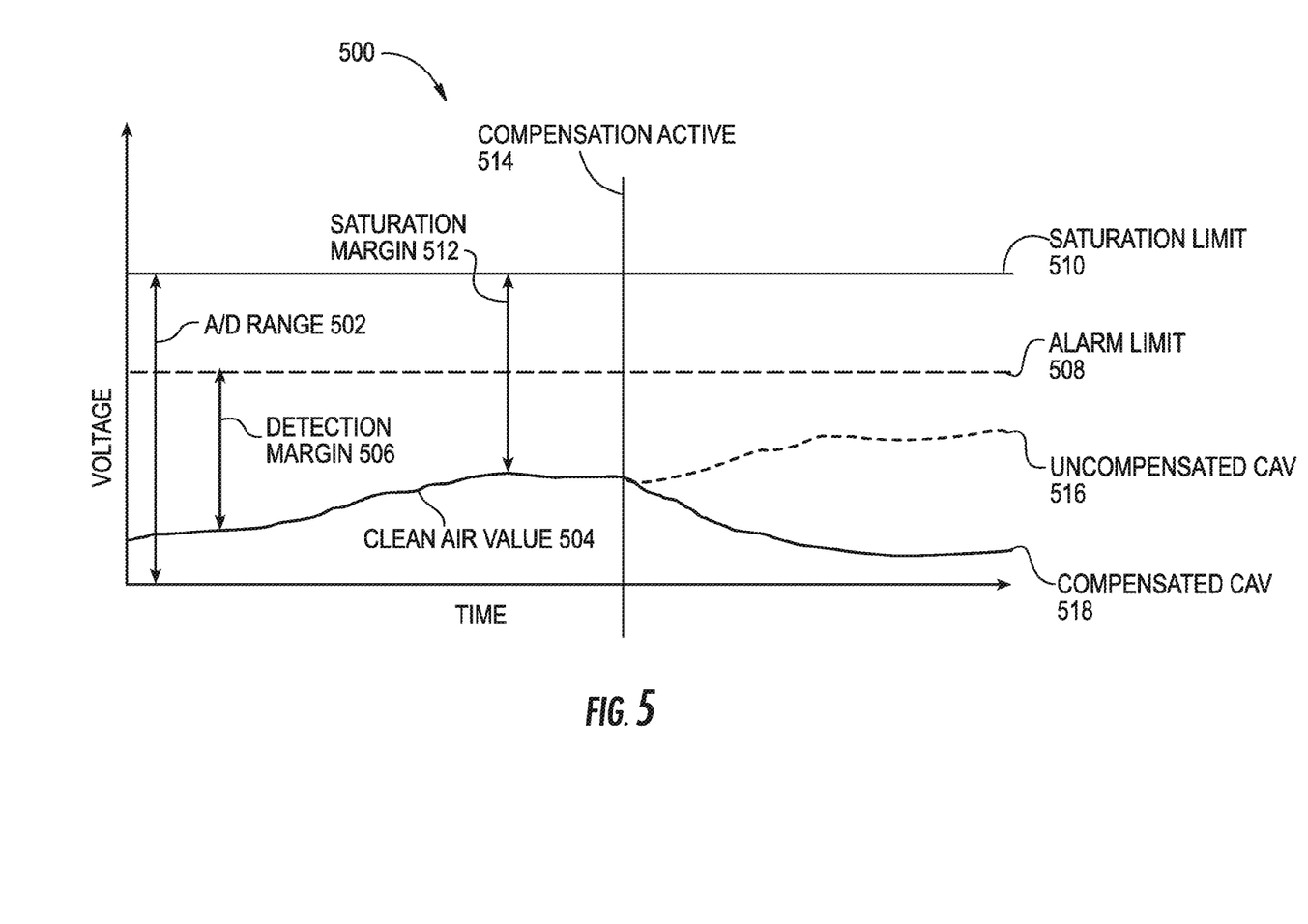
FIG. 5 is a plot of compensation provided by a compensator circuit according to an embodiment.

FIG. 5 illustrates an exemplary plot 500 of the compensation provided by the compensator circuit 65 of FIGS. 3 and 4 according to an embodiment and is described in reference to FIGS. 1-5. The A/D converter 412 has a fixed A/D range 502 that can be expressed in volts or counts. A clean air value 504 can be tracked as a sampled value of a sensor signal from the sensor 64 as observed at the A/D converter 412 and may initially be equivalent to the amplified sensor signal 406 when the compensation offset signal 416 is inactive or has a zero offset value. A detection margin 506 represents a difference between an alarm limit 508 and the clean air value 504. The alarm limit 508 represents a value that, when exceeded, triggers the alarm circuit 34 to broadcast an appropriate audible sound via the sound generation mechanism 48. The maximum number of counts of the A/D converter 412 represents a saturation limit 510, where voltages that exceed the saturation limit 510 cannot be accurately read beyond the A/D range 502. A saturation margin 512 represents a difference between the saturation limit 510 and the clean air value 504 in the example of FIG. 5.

Over time, the clean air value 504 can drift higher due to various effects, such as light ingress, temperature, humidity, dust, and other factors which affect the capacity of sensor 64 to detect light from a light source 63. As the clean air value 504 increases, the detection margin 506 is decreased if the alarm limit 508 remains fixed. There may be limited capacity to increase the alarm limit 508 before reaching the saturation limit 510. As the clean air value 504 increases, the saturation margin 512 also decreases. The reduction in detection margin 506 may increase the risk of nuisance triggering of the alarm circuit 34 as a lesser amount of particles, such as smoke particles, is needed to push the sensor signal read by the A/D converter 412 above the alarm limit 508.

When compensation is active 514, the controller 60 generates a compensation offset signal 416 and outputs the compensation offset signal 416 through the D/A converter 422 as an analog signal to the summing circuit 414 of the compensator circuit 65. The compensation offset signal 416 can be a negative offset to reduce the amplified sensor signal 406 at the summing circuit 414 or a positive offset to increase the amplified sensor signal 406 at the summing circuit 414, producing the compensated sensor signal 418 as an adjustment to the sensor signal as sampled by the A/D converter 412. The plot 500 illustrates how an uncompensated clean air value 516 can continue to increase absent compensation, while a compensated clean air value 518 can provide additional detection margin 506 and saturation margin 512 as compared to the uncompensated clean air value 516 by decreasing the uncompensated clean air value 516 before reaching the A/D converter 412. Performing the compensation as an analog offset can effectively expand the range of offset signals that can be applied to the full range of the D/A converter 422 and the full range of the A/D converter 412, rather than being limited to only the A/D range 502 of the A/D converter 412 as would be the case for a digital-only compensation. For example, if the D/A converter 422 supports a range of 0-2.5 volts and the A/D converter 412 supports a range of 0-2.5 volts, a maximum offset of 2.5 volts by the D/A converter 422 can shift a 4.9 volt signal at the A/D converter 412 down to 2.4 volts, thus making the signal observable without saturating the A/D converter 412. It will be understood that various relationships can exist based on gain values and operative ranges of the A/D converter 412 and the D/A converter 422.

Figure 6:
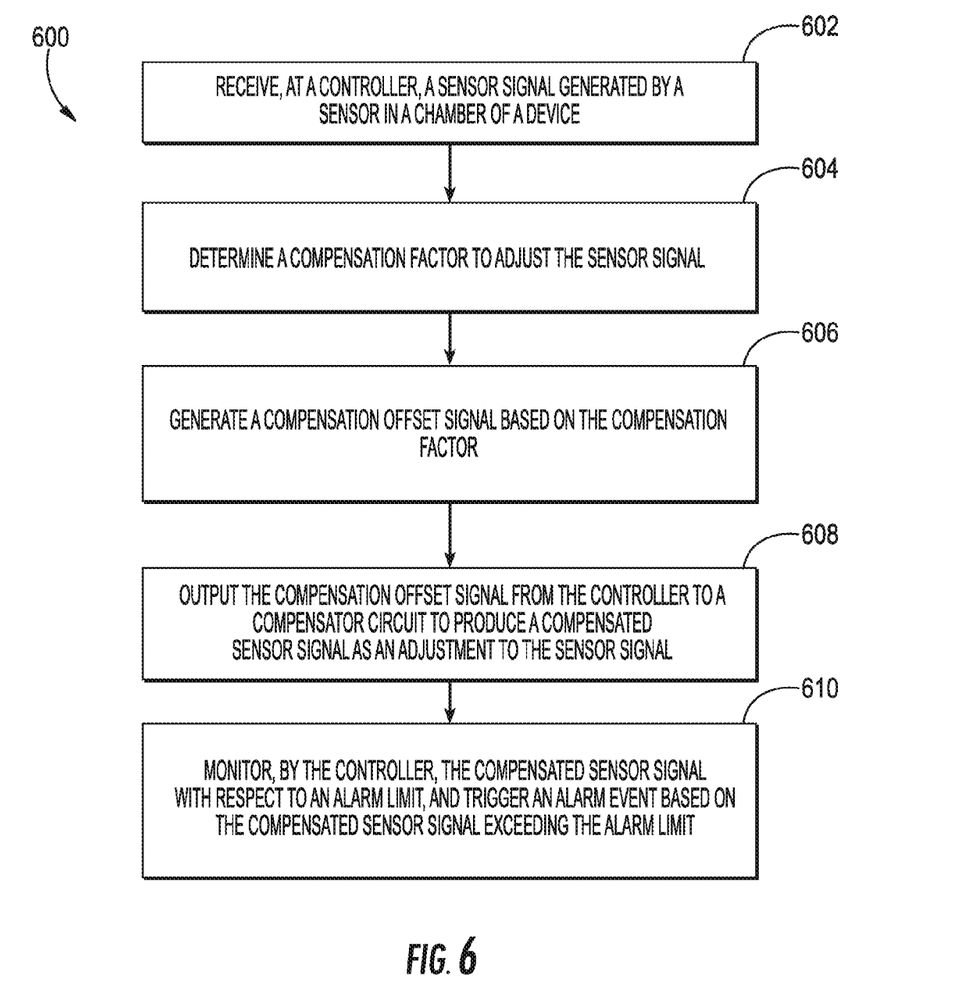
FIG. 6 is a process flow diagram of a method of operating a detector device using a compensator circuit according to an embodiment.

FIG. 6 shows a process flow of a method 600 of operating the detector device 20 of FIG. 1, in accordance with an embodiment of the disclosure. The method 600 is described in reference to FIGS. 1-6 and can include additional steps beyond those depicted in FIG. 6.

At block 602, controller 60 receives a sensor signal generated by the sensor 64. At block 604, the controller 60 determines a compensation factor to adjust the sensor signal. The compensation factor can be set based on a number of conditions or modes of operation. For example, the compensation factor can adjust for manufacturing variations, ambient light, variations in the chamber 62, circuit leakage in the printed circuit board 46, temperature variations, electrical component variations, humidity, dust, and other factors as further described herein. At block 606, controller 60 generates a compensation offset signal 416 based on the compensation factor.

At block 608, controller 60 outputs the compensation offset signal 416 to the compensator circuit 65 to produce a compensated sensor signal 418 as an adjustment to the sensor signal. An amplification circuit 402 of the compensator circuit 65 is operable to amplify a sensor output 404 of the sensor 64 as an amplified sensor signal 406. A summing circuit 414 of the compensator circuit 65 is operable to sum the amplified sensor signal 406 with the compensation offset signal 416 to produce the compensated sensor signal 418. The A/D converter 412 is operable to sample and quantize the compensated sensor signal 418 as a digital value. The D/A converter 422 is operable to convert the compensation offset signal 416 from a digital signal to an analog signal prior to summing at the summing circuit 414. The sensor signal received at the controller 60 can be the amplified sensor signal 406 as sampled and quantized through the A/D converter 412 when the compensation offset signal 416 has a zero offset value (e.g., no positive or negative offset adjustment).

At block 610, controller 60 monitors the compensated sensor signal 418 with respect to an alarm limit 508. During normal operation, controller 60 can periodically energize the light source 63 to support monitoring for increases in the compensated sensor signal 418 indicative of particles, such as smoke particles. The controller 60 can trigger an alarm event based on the compensated sensor signal 418 exceeding the alarm limit 508.

As previously noted, the compensation described herein can adjust for a number of conditions using the compensator circuit 65. The controller 60 can use the compensator circuit 65 to establish a consistent setting for a clean air value 504 in dark conditions of the chamber 62. For example, the controller 60 can de-energize the light source 63, determine one or more error sources included in a clean air value 504 of the sensor signal with the light source 63 de-energized, and determine the compensation factor as an adjustment needed to reach a target baseline clean air value based on the one or more error sources quantified from a combination of factors, such as printed circuit board leakage, component variations, light ingress, and the like. The clean air value 504 while the light source 63 is de-energized represents a starting value for comparison to the alarm limit 508 with detection margin 506. In some embodiments, the ambient light sensor 80 can also be used, for instance, to establish an ambient light level external to the chamber 62 to further fine tune the correction factor. The compensation offset signal 416 can be adjusted through the D/A converter 422 (e.g., 1.5 volts+/− 0.5 volts) until the compensated sensor signal 418 reaches a target baseline clean air value, e.g., 100 millivolts as the target baseline clean air value, for example. This can compensate for manufacturing differences in components of the chamber 62 and other components of the detector device 20 while at nominal temperature/humidity conditions.

The controller 60 can also adjust the compensation factor to null effects of light ingress. For example, the controller 60 can determine whether the compensated sensor signal 418 has increased above a baseline value, and increase the compensation offset signal 416 until the compensated sensor signal 418 is at or below the baseline value. As ambient light leaks into the chamber 62, the clean air value 504 may increase as observed by the compensated sensor signal 418. The baseline value of the clean air value 504 may have previously been tuned to a value, e.g. a value of 100 millivolts, using the compensator circuit 65. Light ingress can be confirmed using the ambient light sensor 80 to observe light levels external to the chamber 62. When the compensated sensor signal 418 drifts above 100 millivolts due to light ingress, the compensation offset signal 416 can be increased, which results in a decrease of the compensated sensor signal 418. Incremental increases of the compensation offset signal 416 can continue until the compensated sensor signal 418 reaches a clean air value 504 of 100 millivolts in this example.

The controller 60 can also use the compensator circuit 65 to implement a hush feature to temporarily remove an alarm limit trip condition and silence the sound generation mechanism 48. For example, the controller 60 can detect a hush request (e.g., through actuatable mechanism 50 and switch 66), increase the compensation offset signal 416 until the compensated sensor signal 418 is below the alarm limit 508 responsive to the hush request, and reset the compensation offset signal 416 after a predetermined period of time elapses from detection of the hush request. When the alarm circuit 34 triggers sound from the sound generation mechanism 48, a user may determine that the inducing event has ended or is not a true emergency (e.g., a result of cooking food). Rather than adjusting the alarm limit 508 further upward in the A/D range 502 at risk of hitting the saturation limit 510, the controller 60 uses the compensator circuit 65 to temporarily drive the compensated sensor signal 418 down below the alarm limit 508 by adjusting the compensation offset signal 416. Prior to adjusting the compensation offset signal 416 for a hush event, the controller 60 can store a copy of the compensation offset signal 416. After a pre-determined period of hush time has elapsed, e.g., fifteen minutes, the controller 60 can restore the compensation offset signal 416 with the previously saved value such that future alarm events will be triggered and other intermediate adjustments to the compensation offset signal 416 are not lost.

As another example, the controller 60 can monitor the temperature sensor 67 to determine a current temperature value. The controller 60 can determine the compensation factor based on the current temperature value and a temperature-to-compensation offset mapping. The temperature-to-compensation offset mapping can change a step size in compensation adjustments in the compensation offset signal 416 for higher or lower temperatures using, for example, a predetermined lookup table. The temperature to compensation offset mapping may be set up as absolute temperature based adjustments or relative adjustments depending upon a rate of temperature change versus time.

As a further example, the controller 60 can use the compensator circuit 65 to null effects of dust ingress into the chamber 62. The controller 60 can track an average value of the compensated sensor signal 418 over an extended time period and decrease the compensation offset signal 416 based on the average value until the compensated sensor signal 418 is at or below a long-term target value. The long-term target value may be 100 millivolts as a clean air value, for example. If the dust ingress results in an average drop in the compensated sensor signal 418, a decrease in the compensation offset signal 416 can be incrementally performed until the compensated sensor signal 418 increases back to the long-term target value.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A detector device comprising:
a light source disposed within a chamber;
a sensor disposed within the chamber;
a compensator circuit electrically coupled with the sensor; and
a controller operable to:
receive a sensor signal generated by the sensor;
determine a compensation factor to adjust the sensor signal;
generate a compensation offset signal based on the compensation factor;
output the compensation offset signal to the compensator circuit to produce a compensated sensor signal as an adjustment to the sensor signal;
energize the light source;
monitor the compensated sensor signal with respect to an alarm limit;
trigger an alarm event based on the compensated sensor signal exceeding the alarm limit;
de-energize the light source;
determine one or more error sources included in a clean air value of the sensor signal with the light source de-energized; and
determine the compensation factor as the adjustment needed to reach a target baseline clean air value representing a starting value for comparison to the alarm limit based on the one or more error sources.

2. The detector device of claim 1, wherein the compensator circuit comprises:
an amplification circuit operable to amplify the sensor signal of the sensor as an amplified sensor signal; and
a summing circuit operable to sum the amplified sensor signal with the compensation offset signal to produce the compensated sensor signal.

3. The detector device of claim 2, wherein the summing circuit is an analog circuit and the sensor is a photo detector sensor.

4. The detector device of claim 3, further comprising:
an analog-to-digital converter operable to sample and quantize the compensated sensor signal as a digital value; and
a digital-to-analog converter operable to convert the compensation offset signal from a digital signal to an analog signal prior to summing at the summing circuit.

5. The detector device of claim 4, wherein the sensor signal received at the controller is the amplified sensor signal as sampled and quantized through the analog-to-digital converter when the compensation offset signal has a zero offset value.

6. The detector device of claim 1, wherein the controller is further operable to:
   determine whether the compensated sensor signal has increased above a baseline value; and
   increase the compensation offset signal until the compensated sensor signal is at or below the baseline value.

7. The detector device of claim 1, wherein the controller is further operable to:
   detect a hush request;
   increase the compensation offset signal until the compensated sensor signal is below the alarm limit responsive to the hush request; and
   reset the compensation offset signal after a predetermined period of time elapses from detection of the hush request.

8. The detector device of claim 1, wherein the controller is further operable to:
   monitor a temperature sensor to determine a current temperature value; and
   determine the compensation factor based on the current temperature value and a temperature to compensation offset mapping.

9. The detector device of claim 1, wherein the controller is further operable to:
   track an average value of the compensated sensor signal over an extended time period; and
   decrease the compensation offset signal based on the average value until the compensated sensor signal is at or below a long-term target value.

10. A method of operating a detector device, the method comprising:
    receiving, at a controller of the detector device, a sensor signal generated by a sensor of the detector device;
    determining, by the controller, a compensation factor to adjust the sensor signal;
    generating, by the controller, a compensation offset signal based on the compensation factor;
    outputting, by the controller, the compensation offset signal to a compensator circuit to produce a compensated sensor signal as an adjustment to the sensor signal;
    determining, by the controller, whether the compensated sensor signal has increased above a baseline value;
    increasing, by the controller, the compensation offset signal until the compensated sensor signal is at or below the baseline value;
    monitoring, by the controller, the compensated sensor signal with respect to an alarm limit; and
    triggering, by the controller, an alarm event based on the compensated sensor signal exceeding the alarm limit.

11. The method of claim 10, further comprising:
    amplifying the sensor signal of the sensor as an amplified sensor signal by an amplification circuit of the compensator circuit; and summing the amplified sensor signal with the compensation offset signal to produce the compensated sensor signal by a summing circuit of the compensator circuit.

12. The method of claim 11, wherein the summing circuit is an analog circuit, the sensor is a photo detector, and the compensator circuit is external to the controller.

13. The method of claim 12, further comprising: sampling and quantizing, by an analog-to-digital converter, the compensated sensor signal as a digital value; and converting, by a digital-to-analog converter, the compensation offset signal from a digital signal to an analog signal prior to summing at the summing circuit.

14. The method of claim 13, wherein the sensor signal received at the controller is the amplified sensor signal as sampled and quantized through the analog-to-digital converter when the compensation offset signal has a zero offset value.

15. The method of claim 10, further comprising:
    de-energizing a light source in a chamber of the detector device, wherein the sensor is disposed in the chamber;
    determining one or more error sources included in a clean air value of the sensor signal with the light source de-energized; and
    determining the compensation factor as the adjustment needed to reach a target baseline clean air value representing a starting value for comparison to the alarm limit based on the one or more error sources.

16. The method of claim 10, further comprising:
    detecting a hush request;
    increasing the compensation offset signal until the compensated sensor signal is below the alarm limit responsive to the hush request; and
    resetting the compensation offset signal after a predetermined period of time elapses from detection of the hush request.

17. The method of claim 10, further comprising:
    monitoring a temperature sensor to determine a current temperature value; and
    determining the compensation factor based on the current temperature value and a temperature to compensation offset mapping.

18. A method of operating a detector device, the method comprising:
    receiving, at a controller of the detector device, a sensor signal generated by a sensor of the detector device;
    determining, by the controller, a compensation factor to adjust the sensor signal;
    generating, by the controller, a compensation offset signal based on the compensation factor;
    outputting, by the controller, the compensation offset signal to a compensator circuit to produce a compensated sensor signal as an adjustment to the sensor signal;
    tracking, by the controller, an average value of the compensated sensor signal over an extended time period;
    decreasing, by the controller, the compensation offset signal based on the average value until the compensated sensor signal is at or below a long-term target value;
    monitoring, by the controller, the compensated sensor signal with respect to an alarm limit; and
    triggering, by the controller, an alarm event based on the compensated sensor signal exceeding the alarm limit.

19. The method of claim 18, wherein a light source is disposed within a chamber of the detector device along with the sensor, the method further comprising:
    determining, by the controller, one or more error sources of the sensor signal with the light source de-energized; and
    determining, by the controller, the compensation factor as an adjustment needed to reach a target baseline value based on the one or more error sources.

20. The method of claim 18, further comprising:
    detecting, by the controller, a hush request;

increasing, by the controller, the compensation offset signal until the compensated sensor signal is below the alarm limit responsive to the hush request; and resetting, by the controller, the compensation offset signal after a predetermined period of time elapses from detection of the hush request.

\* \* \* \* \*